(No Model.)
P. KOCH.
EXPANSION JOINT.
No. 322,457.  Patented July 21, 1885.
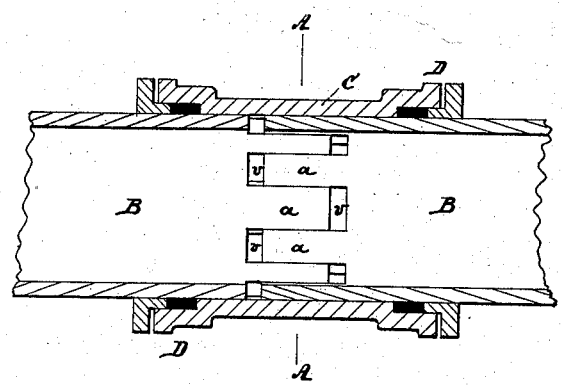
Fig. I.
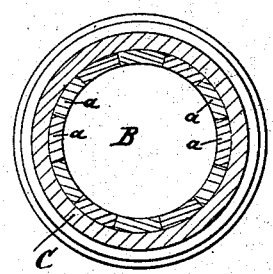
Fig. II.
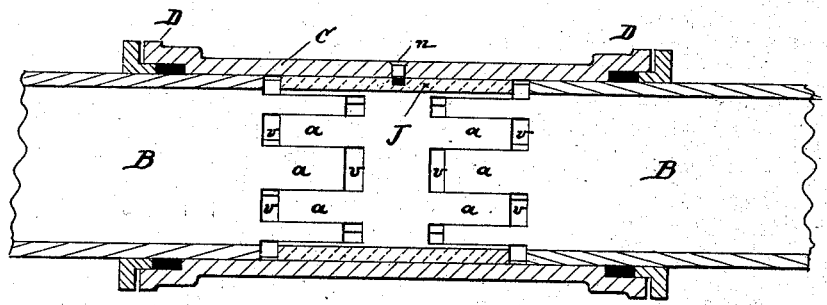
Fig. III.
WITNESS:
E. Lindgens
J. Kotlowsky
INVENTOR
Philipp Koch
BY
Henry E. Roeder
ATTORNEY

UNITED STATES PATENT OFFICE.

PHILIPP KOCH, OF NEW YORK, N. Y.

EXPANSION-JOINT.

SPECIFICATION forming part of Letters Patent No. 322,457, dated July 21, 1885.

Application filed April 26, 1884. (No model.)

*To all whom it may concern:*

Be it known that I, PHILIPP KOCH, a citizen of the United States, residing at New York, in the State of New York, have invented a new and Improved Expansion-Joint, of which the following is a specification.

My invention relates more particularly to expansion-joints for pneumatic tubes, wherein small pistons are made to move to convey messages or parcels; and it consists in the arrangement of parallel tongues and intermediate recesses at the ends of the tubes or at the end of the tube and a suitable connecting-piece fitting into each other, whereby a nearly continuous smooth surface in the interior of the tube will be maintained. Around the outside of this joint a tube or cap is placed in which the internal tubes can move freely. Said cap may be provided with suitable stuffing-boxes.

In the accompanying drawings, Figure I represents a longitudinal section of my improved expansion-joint. Fig. II is a cross-section of the same at line A A, Fig. I. Fig. III shows a longitudinal section of a connecting-piece with a double joint.

Similar letters represent similar parts in all the figures.

B B are the tubes, at the ends of which tongues $a\ a$, with their intermediate recesses, $v\ v$, are made, the tongues of one tube fitting exactly into the recesses of the adjoining pipe or tube, Fig. I. Around this joint a cap, C, is placed, provided at the ends with suitable stuffing-boxes D D, so as to allow the tubes B B a free motion backward or forward, according to the natural contraction or expansion of the same.

The length of the tongues and recesses must be less than the length of the piston moving in the tubes, so as to insure at all times that a part of the piston shall be in the solid part of the tubing, and these joints must be placed at such distance apart that the contraction of the whole length of tubing from joint to joint will not bring the tongues out of their adjoining recesses. Instead of making these tongues all the same length, some of them may be made somewhat shorter than the adjoining tongue.

The cap C may be attached to one of the tubes B, allowing only the other tube to move; or both tubes may be allowed to move, as may be desired.

When it is desired to place the joints farther apart, in which case of course the expansion or contraction of that greater length of tubing would increase, and at the same time to prevent making the tongues longer to correspond with this increased motion of the tubing, a connecting-piece, J, Fig. III, may be arranged in the cap C, having tongues $a\ a$, and alternate recesses $v\ v$ on each end, and into which the tubes B, arranged with corresponding tongues and recesses, are fitted. This connecting-piece J is then fastened to the cap C by means of a suitable bolt or bolts, $n$.

What I claim as my invention, and desire to secure by Letters Patent, is—

A tube provided at its end with tongues $a$ and recesses $v$, fitting into corresponding recesses and tongues on an adjoining pipe, in combination with a surrounding cap, C, arranged to operate in the manner and for the purpose substantially as described.

PHILIPP KOCH.

Witnesses:
HENRY E. ROEDER,
J. B. NONES.